J. F. WITTMANN.
VEHICLE FENDER.
APPLICATION FILED DEC. 26, 1912.
1,087,521.
Patented Feb. 17, 1914.
3 SHEETS—SHEET 1.
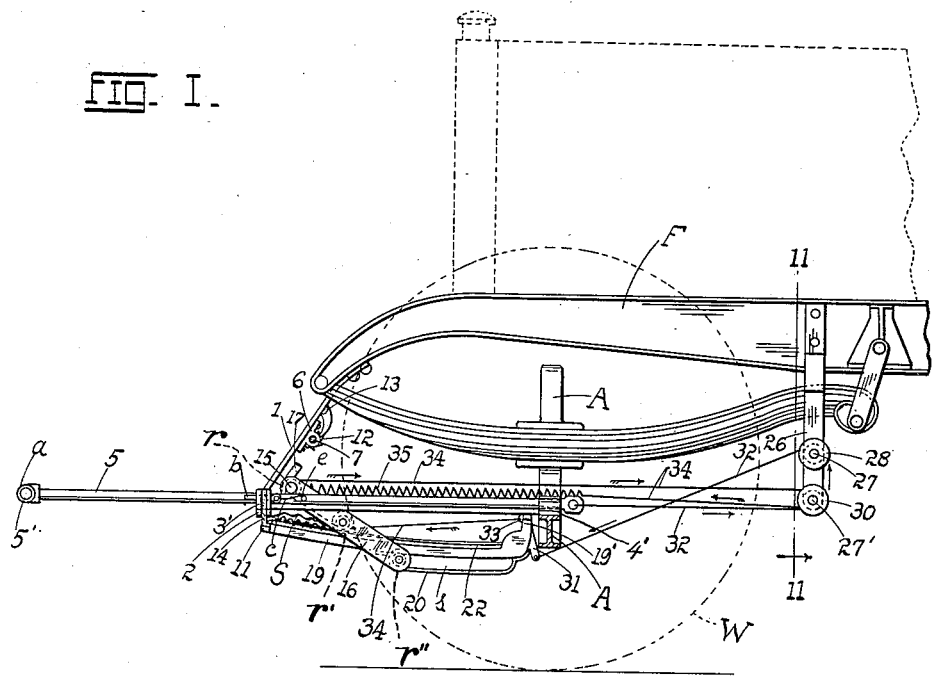
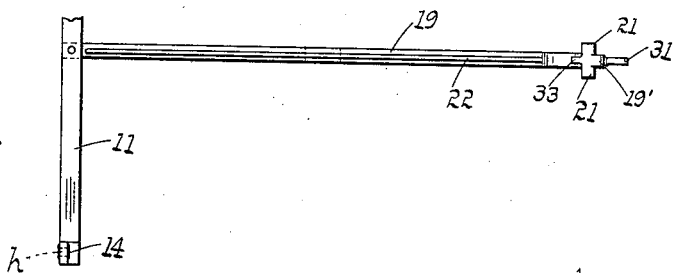
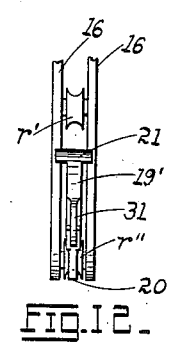
WITNESSES:
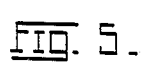
INVENTOR.
Jokshan F. Wittmann.
BY
ATTORNEY.

J. F. WITTMANN.
VEHICLE FENDER.
APPLICATION FILED DEC. 26, 1912.
1,087,521.
Patented Feb. 17, 1914.
3 SHEETS—SHEET 2.
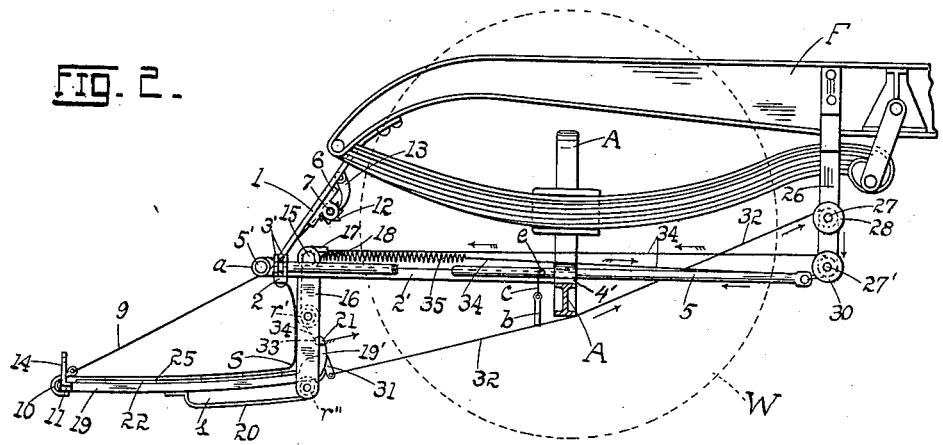
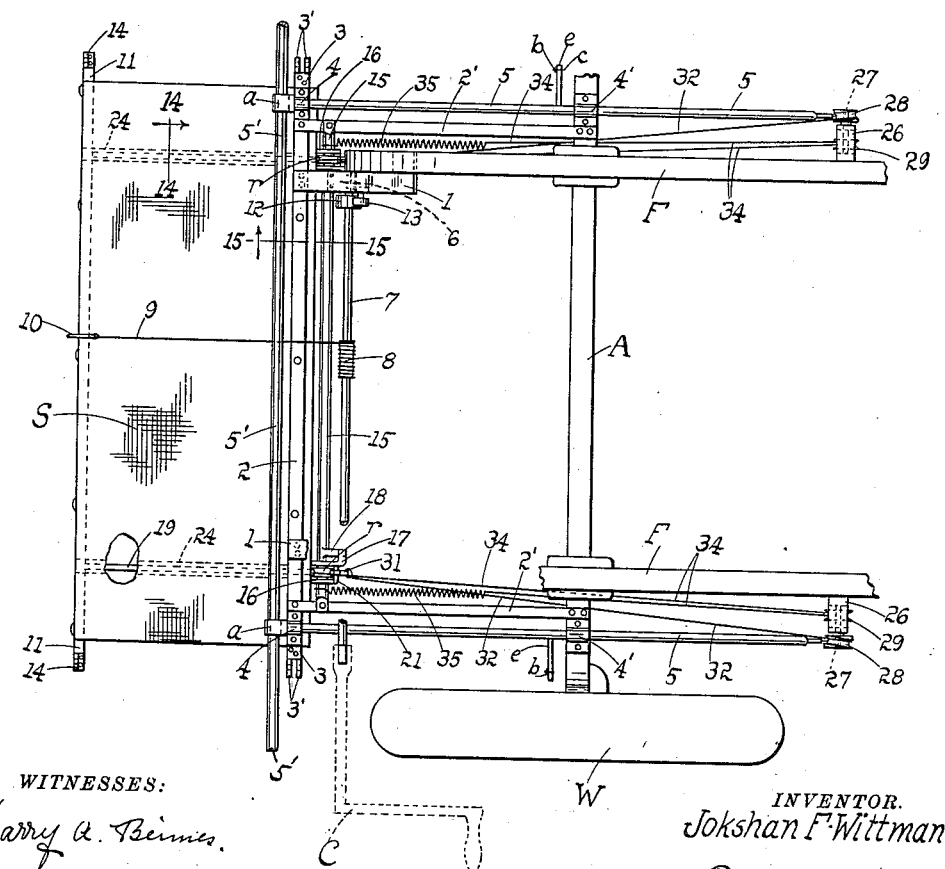
WITNESSES:
INVENTOR.
Jokshan F. Wittmann
BY
ATTORNEY.

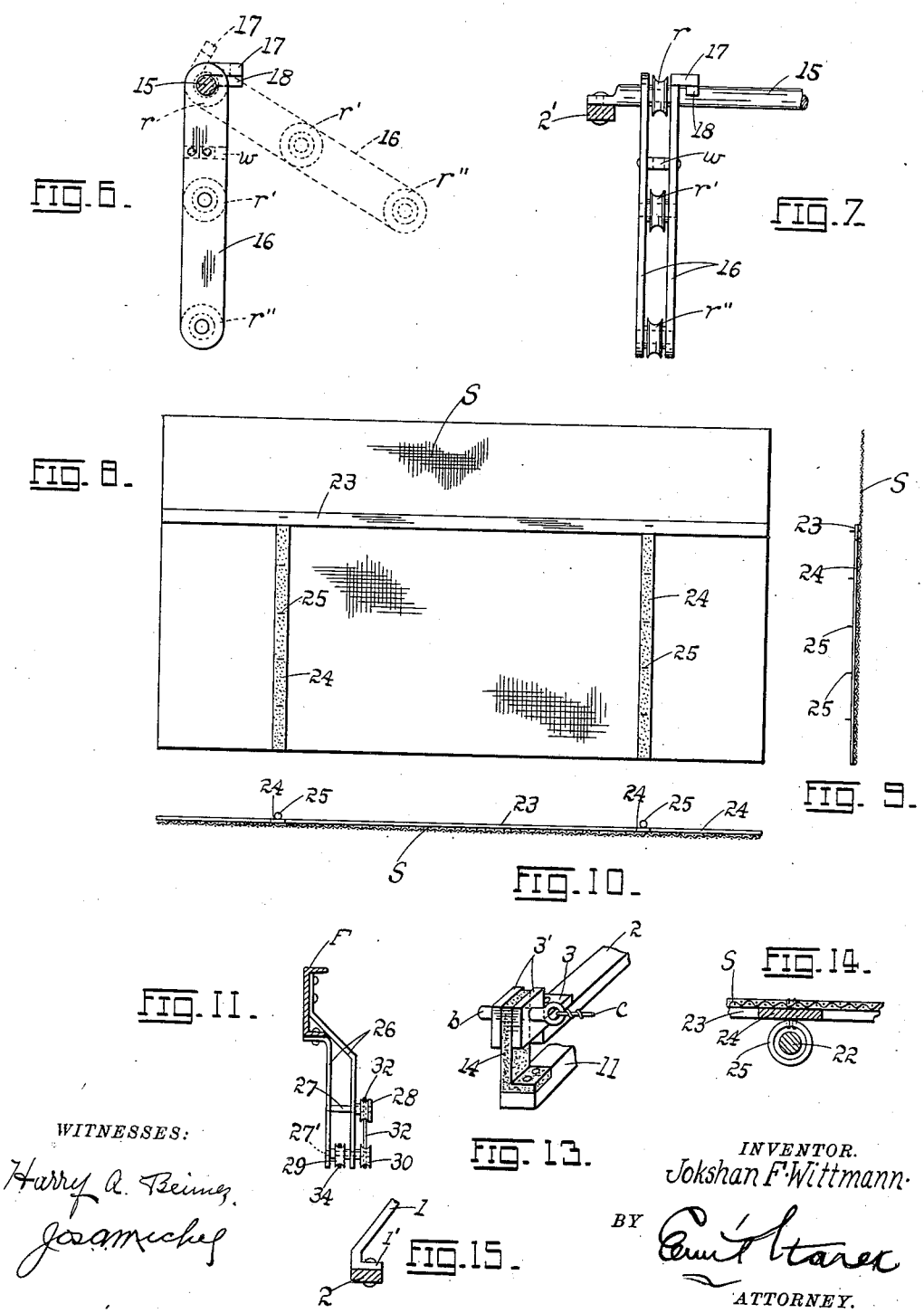

UNITED STATES PATENT OFFICE.

JOKSHAN F. WITTMANN, OF ST. LOUIS, MISSOURI.

VEHICLE-FENDER.

1,087,521.  Specification of Letters Patent.  Patented Feb. 17, 1914.

Application filed December 26, 1912. Serial No. 738,726.

*To all whom it may concern:*

Be it known that I, JOKSHAN F. WITTMANN, a citizen of the United States, residing at St. Louis, State of Missouri, have invented certain new and useful Improvements in Vehicle-Fenders, of which the following is a full, clear, and exact description, reference being had to the accompanying drawings, forming a part hereof.

My invention has relation to improvements in fenders for self-propelled vehicles; and it consists in the novel details of construction more fully set forth in the specification and pointed out in the claims.

In the drawings, Figure 1 is a side elevation of the front end of an automobile frame with axle broken and front wheel removed, showing my invention set in normal position; Fig. 2 is a similar view with the fender projected outwardly or forwardly after impact of the buffer with a person or object in the path of the vehicle; Fig. 3 is a top plan of Fig. 2; Fig. 4 is a top plan of a section of the fender-frame; Fig. 5 is a side elevation of the fender-frame, the canvas being removed; Fig. 6 is a side view of the suspending links for the fender-frame; Fig. 7 is a view at right angles to Fig. 6, showing a section of the rod to which the links are hinged; Fig. 8 is a bottom plan view of the fender cover-sheet; Fig. 9 is a side edge view thereof; Fig. 10 is a front edge view of Fig. 8; Fig. 11 is a vertical cross-section on the line 11—11 of Fig. 1 showing the brackets which support the guide rollers for the cable attached to the fender-frame; Fig. 12 is a rear elevation of the runner member of the fender-frame and the links through which said member operates, the links being shown partly broken away; Fig. 13 is a perspective detail showing the means for coupling the fender-frame to the front bar of the buffer-supporting frame when the parts are set for action; Fig. 14 is a cross-sectional detail on the line 14—14 of Fig. 3, limited to the canvas cover of the fender frame and the rod over which the rings on the cover slide; and Fig. 15 is a detail section on the line 15—15 of Fig. 3, showing the manner of securing the buffer-supporting frame to the front brackets.

The present invention is specially directed to fenders for automobiles and has for its object to provide a life-saving device which will instantly respond upon impact with the person or object struck, the fender being released, to catch the person after impact, with a minimum amount of resistance, thus insuring for the injured one a receptacle or bed on which he may be deposited and thus prevented from being run over by the vehicle, or from coming in contact with the machinery.

A further object is to provide a fender which can be readily set for action after being once released from its normal position on the vehicle; one operating with a minimum amount of friction; one which is light, readily attachable to existing machines; and one possessing further and other advantages better apparent from a detailed description of the invention which is as follows:

Referring to the drawings, F represents the body-supporting frame of an automobile, the same having depending from the front end thereof suitable forwardly projecting brackets or hangers 1, 1, provided with inwardly-bent lower terminals or lugs 1', 1', to which is secured a cross-bar 2, said bar terminating at each end in a casting or plate 3 provided with a pair of upwardly projecting lugs or fork-members 3', 3', extending beyond the end of the bar (Figs. 3 and 13). At points on the bar 2 between the sides of the frame F and the vehicle-wheels W, are disposed bearings 4, 4, the same being in alinement with similar bearings 4', 4', on the bent axle A (the said axle being of conventional form as well understood in the art). Within the bearings 4, 4', are free to slide the longitudinal members or rods 5, 5 of the buffer frame, the front member 5' of which is secured through loops $a$, $a$, to the side members 5, in front of the cross-bar 2. To the rear of each hanger 1 is secured a bearing 6, there being mounted in and between the bearings a shaft 7 provided with a centrally disposed grooved winding spool 8 over which is free to wind and unwind a cable 9, the free end of which terminates in a hook 10 adapted to be temporarily placed in engagement with the front cross-bar 11 of the fender-frame to be presently more fully described. The shaft 7 may be actuated by a crank-handle C, the socket of which is fitted over the square or polygonal end of the shaft, when necessary. At each end of the shaft is a ratchet disk 12 controlled by a gravity pawl 13 hinged to each hanger 1 and to one side thereof (Fig. 3), the pawl preventing accidental rotation of the shaft in the wrong direction (as presently to be seen). The member 11 terminates at each end in a leather or equivalent flexible tongue 14 adapted to be received (at the proper time) between the lugs or fork-members 3', 3', for a purpose presently to be described, a securing pin $b$ being inserted through alining openings or holes $h$ of the several lugs (Fig. 13), the pin being secured to one end of a wire or cord $c$ whose opposite end is coupled to a pin $e$ on the member 5.

The bar 2 constitutes the front member of the buffer-supporting and guide-frame, the side members of the frame being the longitudinal bars 2', 2', the rear ends of which are secured to the axle A. (Fig. 3). Carried by, or forming a part of said frame (2, 2', 2',) and disposed adjacent and parallel to, the front member 2, is a cylindrical rod 15 to each end of which are pivotally connected the upper ends of the pair of links 16, 16, between which are mounted rollers $r$, $r'$, $r''$, the roller $r$ being mounted directly on the rod (Fig. 7). From the upper terminal of one of the members of each pair of said links extends laterally a finger 17 which is adapted to engage or strike a lug 18 on the rod 15, the lug 18 arresting the finger 17 and thus preventing the links from swinging outwardly beyond a vertical position (Fig. 2). The lowermost roller $r''$ is adapted to traverse a slot or way $s$ formed between the concaved edge of the bowed member or runner 19 forming a component part of the fender-frame, and a strap 20 secured thereto, the said member 19 freely riding on said roller between the link members (Figs. 1, 2, 12). The rear end of said member or runner terminates in an upwardly projecting enlargement or lobe 19' which in turn terminates in a cross or T 21 the arms of which are of sufficient length to engage the edges of the links 16, and thus serve to arrest the runners in the forward or outward movement. Disposed above the concave edges of the runners are rods 22 for a purpose presently to appear.

The members 11, 19, 19, together with the strap 20, collectively constitute the fender frame, the rear end of which may be considered as suspended from the links 16, 16, the lower roller ends of which are permitted a definite length of traverse depending on the length of the slots $s$, $s$. This fender frame is covered by a sheet of canvas, burlap, or other sheet material S, the underside of which is reinforced by a longitudinal metal or equivalent strip 23 (disposed transversely of the vehicle) and provided with transverse leather or equivalent strips 24 (disposed longitudinally of the vehicle), said strips carrying rings 25 (preferably sewed thereto) which play over the rods 22 on the order of draw curtains or tarpaulins, whereby with an inward movement of the fender (that is to say, the fender-frame and its sheet cover)

the sheet S may be drawn together or puckered. The upper edge of the sheet is secured to the member 2, the sheet being brought up in the rear in front of the links 16, 16, whereby with an outward movement of the fender the sheet may serve as a receptacle to catch the person or object struck.

Depending rigidly from the frame F, on each side of the vehicle are pairs of brackets 26, 26, which support an upper spindle 27 carrying an outer roller 28, and a bottom spindle 27' carrying an inner roller 29 and an outer roller 30 (Fig. 11). Formed with the lobe 19' of each runner 19 is a lug 31 to which is secured one end of a cable 32, said cable passing over the roller 28, thence over the roller 30 and the opposite end of the cable being secured to the rear end of the member 5 of the buffer-frame. Formed on the free end of the lobe 19' opposite the center of the T 21 and on the front side of said lobe is an eye 33 (Fig. 5) to which is secured one end of a cable 34, said cable passing over the roller $r'$, thence over the roller $r$ (being guided through a spacing wall $w$ between the links 16, 16, Fig. 7) whence it passes rearwardly over the inner roller 29 (carried by the brackets 26) and thence forwardly, where its end is connected to the rear end of a contracting fender-ejecting spring 35, the forward end of the spring being coupled to the rod 15.

The operation of the fender may be described as follows:—It is obvious from the manner of mounting the buffer and fender frames, that as one moves inwardly the other moves outwardly and vice versa, so that if the buffer frame is projected forward, the fender will necessarily be retracted inwardly, or if we force the fender inwardly the buffer will be pushed outward. This may be seen to advantage in Fig. 1, in which the front end of the fender is shown locked to the buffer supporting frame by means of the pins $b$. To set the fender in this position the chauffeur may either push it inward by hand (from its outwardly projected position, Fig. 2), or by turning the shaft 7 in proper direction he may wind up the cable 9 and draw the fender inwardly until the tongues 14 at the front end thereof can be conveniently passed between the lugs 3', 3', of the bar 2, and the pins $b$ inserted through the holes $h$ of the parts thus assembled. In thus pushing the fender inward, the links 16, whose lower roller ends traverse the slots $s$ will be forced to the inclined position shown in Fig. 1, a draft being at the same time exerted on the cables 34 and on the springs 35 which thus become stretched. This inward movement of the fender removes any strain from the cables 32 thus allowing the buffer frame 5, 5, 5', to be pulled outwardly, the parts being thus set in operative position. It is when the buffer frame is thus pulled out or set into operative position that the pins b are availed of to lock the fender to the member 2. It will be seen that the cord c by which the pin b is secured to the pin e of the buffer-frame is of such a length that the buffer frame when once set as described can not be pushed back to any great extent without exerting a draft on the cord or wire c and pulling out the pin b from the lugs 3', 3', and tongue 14. This is precisely what happens when the buffer (which normally projects a suitable distance in front of the vehicle-body) strikes a person in the path of the vehicle. The impact pushes the buffer rearward, and in such rearward movement a draft is exerted on the wires c and the pins are pulled out. This releases the front end of the fender-frame causing it to drop and allowing the spring 35 (which is under considerable tension) to contract, in which contraction it draws on the cable 34 (see arrows Fig. 1) in such manner as to eject the fender frame from its position under the vehicle, and force the same outwardly (Fig. 2) to catch the person struck by the buffer. In this outward ejectment of the fender the draft will be exerted on the connecting cables 32 (see arrows Fig. 1) in a direction to pull the buffer (partly pushed inward under the force of the impact with the person or object struck) under the vehicle body (see Fig. 2). Of course where a winding cable such as 9 is used to draw the fender in, preparatory to setting the parts for action, the hook 10 is detached so as to permit of the ejection of the fender should a person come in contact with the buffer. To unwind the cable 9 after being once wound, in the drawing in of the buffer, the chauffeur disengages the pawl 13 from the ratchet 12, which permits the shaft 7 to be reversed for the purpose. Of course, when the fender is set for action (by moving the same under the vehicle frame) the tension on the cable 32 is released, thus allowing the buffer to be moved outwardly to a corresponding extent. In shoving the fender inward, the canvas or burlap sheet S is free to fold or pucker the necessary degree owing to the free play of the rings 25 along the rods 22 (Fig. 1). In its forward or outward movement the fender frame is arrested from undue forward and downward oscillation (about the common axis of the rollers $r''$ from which it is suspended) by the T 21 striking the rear edges of the links 16 (Figs. 5, 12); otherwise there would be the danger of the front edge of the fender frame striking the ground which is to be avoided, the object being to afford a springy or yielding landing place or cradle for the person injured. When the fender frame is shoved back under the vehicle-body, the links 16 serve as tie rods or tension members as is quite obvious from the drawings (Fig. 1). It may be stated that upon the withdrawal of the locking pin b, the tension exerted by the spring 35 causes the tongue 14 to yield, so that the front end of the fender frame is bound to drop and be forced outwardly under the driving force of said spring.

Having described my invention, what I claim is:—

1. In combination with a vehicle, a horizontally reciprocating buffer frame, a member disposed transversely across the front of the vehicle rearward of the front member of said frame, links pivotally depending from said transverse member, a fender frame provided with slotted runner members, the lower ends of the links traversing the slots of said runners, means on the front end of the fender frame for permitting the locking thereof to the front of the vehicle, suitable locking means connected to the buffer frame, the fender frame having a combined horizontal reciprocating and a vertical movement, suitable cable connections between the frames for permitting a horizontal movement of the frames simultaneously in opposite directions, means for disengaging the locking means with a rearward movement of the buffer frame upon impact with a person in the path of the vehicle, and springs for automatically forcing the fender frame forward upon release of said fender frame from the locking means.

2. In combination with a vehicle, a horizontally reciprocating buffer frame, a transverse rod mounted on the vehicle rearward of the front end of the buffer-frame, links disposed in pairs and pivotally suspended at each end of the rod, a fender frame comprising a front transverse member and longitudinally disposed slotted runners operating between the members of each pair of links, terminal bottom rollers on the links traversing the slots on the runners, a locking pin for coupling the front end of the fender frame to the vehicle, means for connecting the pin to the buffer frame whereby, upon a rearward movement of the said frame after impact, the pin is retracted and the fender frame released, means on the rear ends of the runners for engaging the rear edges of the links to arrest the forward movement of the fender frame, cables connecting the rear ends of the fender and buffer frames, means for guiding said cables to permit a simultaneous horizontal movement of the respective frames in opposite directions, tension springs for actuating the fender frame secured to the vehicle, cables leading from the springs to the rear ends of the runners aforesaid, and means for guiding the cables through the links in proper direction to permit a simultaneous horizontal movement of the respective frames in opposite directions, whereby upon release of the fender frame the said frame is projected forward and outward with an inner or rearward movement of the buffer frame due to impact with a person or object in the path of the vehicle.

3. In combination with a vehicle, a cross-rod, links suspended therefrom, a fender frame coupled to the lower ends of the links and capable of a limited horizontal movement across the links, laterally projecting fingers on the upper ends of the links, and lugs on the cross-rod for engaging the fingers and thereby limiting the oscillation of the links in one direction.

4. In combination with suitable suspension links arranged in pairs, a fender-frame provided with runners adapted to operate between the members of each pair of links, the rear ends of the runners being turned upward and terminating in cross-arms or T's, said arms being adapted to engage the rear edges of the link members with a forward movement of the runners, for the purpose set forth.

In testimony whereof I affix my signature, in presence of two witnesses.

JOKSHAN F. WITTMANN.

Witnesses:
EMIL STAREK,
JOS. A. MICHEL.

---

Copies of this patent may be obtained for five cents each, by addressing the "Commissioner of Patents, Washington, D. C."